(No Model.) 2 Sheets—Sheet 2.
A. SCHOONOVER, Jr.
CULTIVATOR.
No. 295,292. Patented Mar. 18, 1884.
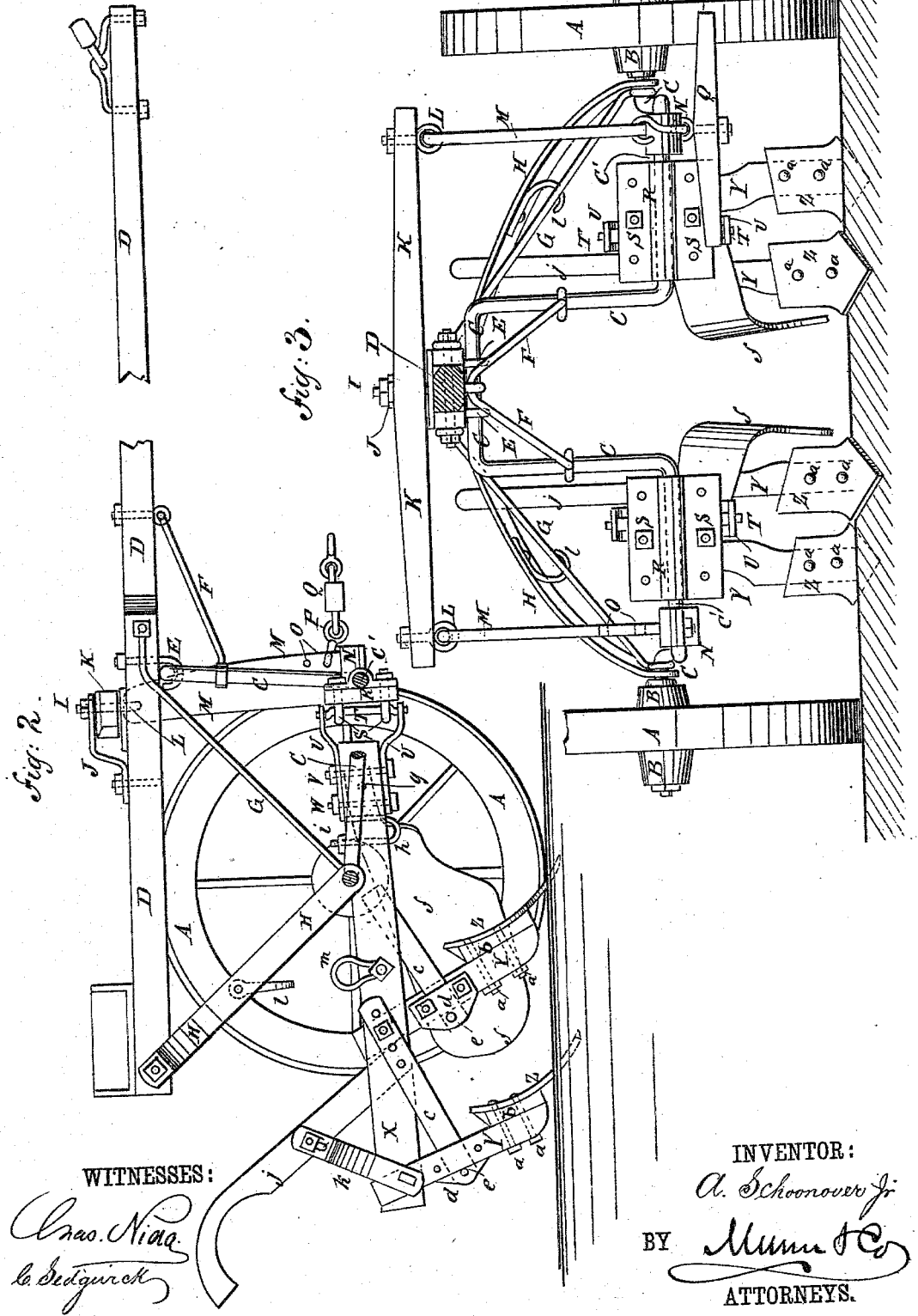
WITNESSES:
Chas. Nida.
C. Sedgwick
INVENTOR:
A. Schoonover Jr
BY Munn & Co
ATTORNEYS.

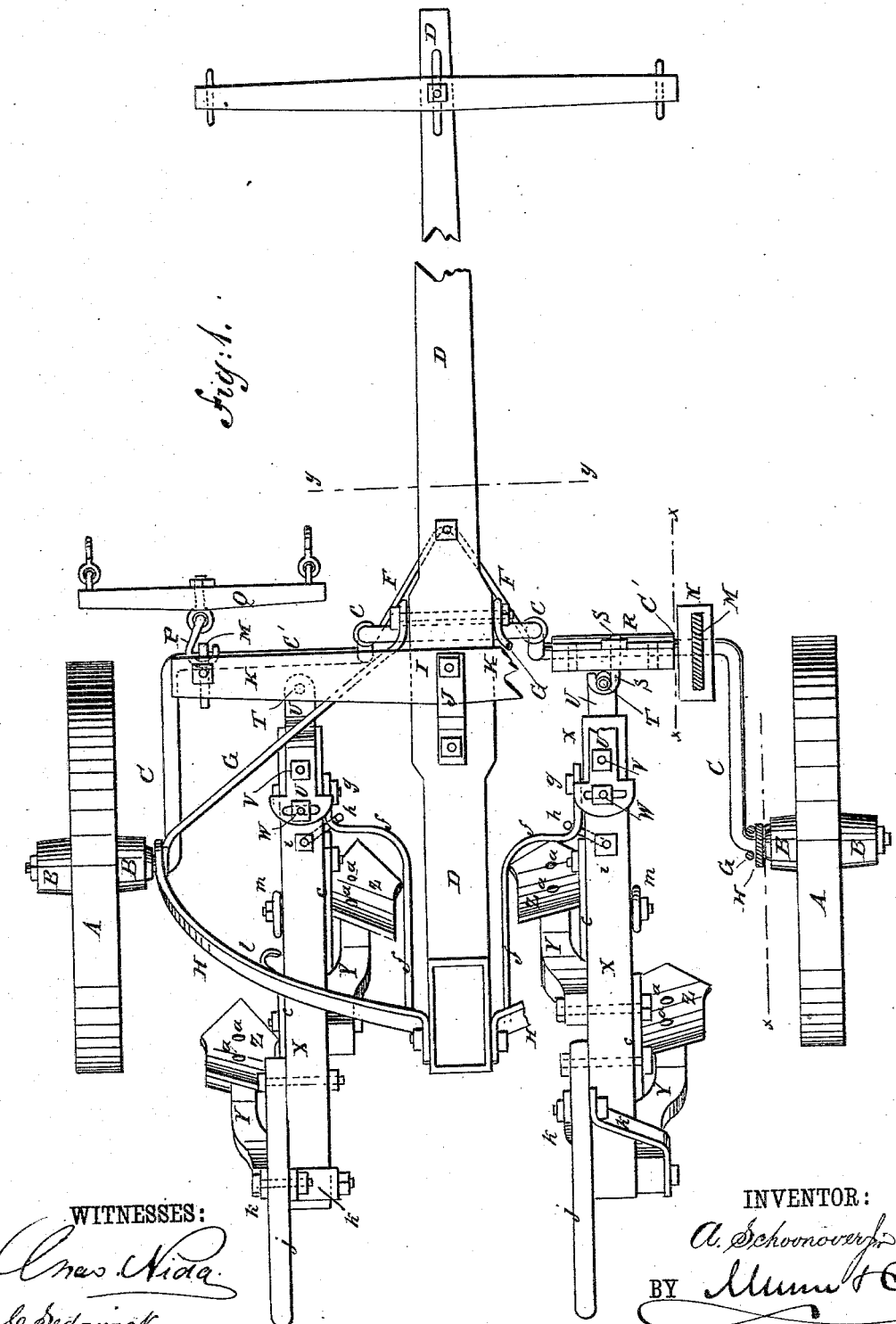

UNITED STATES PATENT OFFICE.

ALVAH SCHOONOVER, JR., OF ELLIOTT, IOWA.

CULTIVATOR.

SPECIFICATION forming part of Letters Patent No. 295,292, dated March 18, 1884.

Application filed December 28, 1883. (No model.)

*To all whom it may concern:*

Be it known that I, ALVAH SCHOONOVER, Jr., of Elliott, in the county of Montgomery and State of Iowa, have invented a new and useful Improvement in Cultivators, of which the following is a full, clear, and exact description.

Reference is to be had to the accompanying drawings, forming a part of this specification, in which similar letters of reference indicate corresponding parts in all the figures.

Figure 1, Sheet 1, is a plan view of my improvement, parts being broken away. Fig. 2, Sheet 2, is a side elevation of the same, partly in section through the broken line $x\,x$, Fig. 1. Fig. 3, Sheet 2, is a front elevation of the same, the tongue being shown in section through the line $y\,y$, Fig. 1.

The object of this invention is to facilitate the adjusting and controlling of cultivators and promote efficiency in the operation of said cultivators.

My invention consists in the construction and arrangement of parts for connecting the plow-beams with the axle, as will be hereinafter fully described and claimed.

A represents the wheels, the ends of the hubs of which are provided with projecting bands B, to prevent dirt from entering the said hubs. At the inner ends of the hubs of the wheels A the axle C is bent forward at right angles, and at points about opposite the forward parts of the rims of the wheels A, the said axle is bent inward at right angles, to form bearings C′ for the plow-beam couplings, and is then bent upward and then inward, and is attached at its center to the under side of the tongue D by hook-bolts E or other suitable means. The connection between the axle C and the tongue D is strengthened and made rigid by the braces F G H. The braces F are attached at their forward ends to the lower side of the tongue D, and at their rear ends to the upright parts of the axle C. The braces G are attached at their forward ends to the opposite sides of the tongue D, a little in front of the upper part of the axle C, and at their rear ends to the said axle C at the inner ends of the hubs of the wheels A. The braces H are attached at their forward ends to the axle C, at their inner ends to the hubs of the wheels A, and at their rear ends to the opposite sides of the rear end of the tongue D.

To the tongue D, a little in the rear of the upper part of the axle C, is pivoted, by a bolt, I, and hammer-strap J, the double-tree K.

To the lower sides of the ends of the double-tree K are hinged, by hook or eye bolts L, or other suitable means, the upper ends of the draw-bars M, the lower ends of which are hinged, by bearings N or other suitable means, to the outer ends of the parts C′ of the axle C.

In the lower parts of the upright draw-bars M are formed a number of holes, O, to receive the hooks P, that connect the whiffletree Q to the said draw-bars, so that the points of draft attachment can be raised or lowered, as may be required.

Upon the parts C′ of the axle C are placed bearings or couplings R, the parts of which are fastened together by two or more hook-bolts, S. The hook-bolts S also clamp the rods T against the rear sides of the couplings R. The rods T are made of such a length that their ends will project beyond the side edges of the couplings R, as shown in Figs. 2 and 3, to receive the forward ends of the clevis-straps U, the rear parts of which are secured by bolts V W to the upper and lower sides of the forward ends of the plow-beams X. The forward bolts, V, pass through holes in the beams X and straps U, and the bolts W pass through holes in the beams X and cross-slots in the widened rear ends of the said straps U, so that by loosening the nuts of the said bolts the plow-beams can be adjusted parallel or at an inclination with the line of draft, as may be desired. By this construction the rear ends of the plow-beams X will have free vertical and lateral movements, so that the plows can be readily guided and controlled.

To the outer sides of the rear ends of the beams X, and to the inner sides of the said beams, at a suitable distance in front of the said rear ends, are attached the upper ends of the plow-standards Y, which are bent outward and then downward, and to their lower ends are secured the shovel-plows Z by bolts $a$, which pass through the said plows and standards, and through the blocks $b$, interposed between the said plows and standards, to form seats for the said plows. The plows Z are made with their inner sides lower than their outer sides, as shown in Fig. 3, and are slightly curved toward the said lower side, as shown in Fig. 1, so that the dirt will be discharged principally at the said lower side. The draft-strain upon the standards Y is sustained by the braces $c$, the forward ends of which are secured to the sides of the beams X by bolts. Several holes are formed in the forward parts of the braces $c$, to receive the fastening-bolts, so that the said braces can be readily adjusted to give any desired pitch to the plows. The rear ends of the braces $c$ pass through keepers $d$, attached to the sides of the standards Y, and have wooden pins $e$ passed through them, which rest against the rear sides of the standards Y and the rear edges of the keepers $d$, and which are made of such a strength as to sustain the draft-strain under ordinary circumstances, but will break should the plows strike an obstruction, and allow the standards to swing back, and thus prevent the plows from being broken.

$f$ are the fenders, the upper parts of the forward ends of which are extended, and are bent inward and then forward, so that the said forward ends will rest against the inner sides of the plow-beams X, while the bodies of the said fenders are in proper position at the sides of the plows to protect the plants from the soil thrown by the said plows. The forward ends of the fenders $f$ are hinged to the inner sides of the plow-beams X by bolts $g$ passing through them and through the said beams to allow the fenders to have a free vertical movement. The downward movement of the fenders $f$ is limited by the U-shaped rods $h$, one arm of each of which passes up through a plow-beam, X, and has a nut, $i$, screwed upon its upper end. The forward parts of the fenders $f$ pass through the bends of the rods $h$, so as to limit the downward movement of the said fenders, and support the said fenders when out of contact with the soil.

The U-rods $h$ can be adjusted to support the fenders at any desired distance above the ground by turning the nuts $i$ up or down.

To the rear parts of the beams X are attached the lower ends of the handles $j$, which are strengthened in position by the braces $k$. The upper ends of the braces $k$ are attached to the handles $j$, and their lower ends are bolted to the beams X or rear standards, Y.

To the braces H are attached hooks $l$, to receive eyestraps or loops $m$, attached to the beams X, to hold the said beams and their attachments suspended above the ground, for convenience in turning around and in passing from place to place.

I do not desire to claim the axle or the means of connecting it with the tongue by the brace-rods, nor the draft-bars connecting the doubletree with the axle, as I am aware that they are not new.

Having thus described my invention, I claim as new and desire to secure by Letters Patent—

In a cultivator, the combination, with the lower forward part, C′, of the axle C, and the plow-beams X, of the coupling-bearings R, and pins T, and the adjustable clevis-straps U, substantially as herein shown and described, whereby the rear ends of the said plow-beams can have a free vertical and lateral movement, and their forward ends can be adjusted inward or outward, as set forth.

ALVAH SCHOONOVER, JR.

Witnesses:
CHARLES O. EVANS,
WILLIAM H. AMMONS.